(12) United States Patent
Nishiwaki et al.

(10) Patent No.: US 11,794,709 B2
(45) Date of Patent: Oct. 24, 2023

(54) BRAKING CONTROL DEVICE

(71) Applicant: ADVICS CO., LTD., Kariya (JP)

(72) Inventors: Kunihiro Nishiwaki, Toyota (JP); Jun Nomura, Nagoya (JP); Yasuhito Ishida, Toyokawa (JP); Tatsushi Kobayashi, Kariya (JP)

(73) Assignee: ADVICS CO., LTD., Kariya (JP)

( * ) Notice: Subject to any disclaimer, the term of this patent is extended or adjusted under 35 U.S.C. 154(b) by 449 days.

(21) Appl. No.: 16/980,113

(22) PCT Filed: Mar. 28, 2019

(86) PCT No.: PCT/JP2019/013785
§ 371 (c)(1),
(2) Date: Sep. 11, 2020

(87) PCT Pub. No.: WO2019/189657
PCT Pub. Date: Oct. 3, 2019

(65) Prior Publication Data
US 2021/0016755 A1    Jan. 21, 2021

(30) Foreign Application Priority Data
Mar. 30, 2018  (JP) ................. 2018-069135

(51) Int. Cl.
*B60T 8/17*    (2006.01)
*B60T 13/68*   (2006.01)
(Continued)

(52) U.S. Cl.
CPC .............. *B60T 13/686* (2013.01); *B60T 8/17* (2013.01); *B60T 8/4081* (2013.01);
(Continued)

(58) Field of Classification Search
CPC ...... B60T 8/4081; B60T 8/409; B60T 13/686; B60T 2270/82; B60T 2220/04; B60T 15/028; B60T 8/17
See application file for complete search history.

(56) References Cited

U.S. PATENT DOCUMENTS 9,802,592 B2 * 10/2017 Okano ...................... B60T 8/34
2010/0219026 A1    9/2010 Fukasawa et al.
(Continued)

FOREIGN PATENT DOCUMENTS

JP        2009023553 A      2/2009
WO    WO-2016132865 A1 *  8/2016 .............. B60T 17/18

OTHER PUBLICATIONS

International Search Report (PCT/ISA/210) dated Jun. 18, 2019, by the Japanese Patent Office as the International Searching Authority for International Application No. PCT/JP2019/013785.
(Continued)

*Primary Examiner* — Bradley T King
(74) *Attorney, Agent, or Firm* — BUCHANAN INGERSOLL & ROONEY PC

(57) ABSTRACT

The present disclosure comprises a reservoir cutoff valve provided on a pipe and configured to be opened in a non-energization state; a simulator cutoff valve provided on a pipe and configured to be closed in a non-energization state; an operation determination circuit configured to determine whether the brake operation member is in an operation execution state in which the brake operation member is being operated is; and a current control circuit that, when the operation determination circuit determines that the brake operation member is not in an operation execution state, supplies a first current to the reservoir cutoff valve, and when the operation determination circuit determines that the brake operation member is in an operation execution state,
(Continued)

supplies a second current greater than the first current to the reservoir cutoff valve.

18 Claims, 2 Drawing Sheets

(51) Int. Cl.
*B60T 8/40* (2006.01)
*B60T 15/02* (2006.01)
*B60T 8/44* (2006.01)

(52) U.S. Cl.
CPC ............ *B60T 15/028* (2013.01); *B60T 8/441* (2013.01); *B60T 2220/04* (2013.01); *B60T 2270/82* (2013.01)

(56) References Cited

U.S. PATENT DOCUMENTS

| | | | |
|---|---|---|---|
| 2017/0274879 A1* | 9/2017 | Okochi | B60T 8/4081 |
| 2020/0290576 A1* | 9/2020 | Kobayashi | B60T 8/409 |
| 2022/0089136 A1* | 3/2022 | Taran | B60T 13/142 |
| 2022/0281424 A1* | 9/2022 | Shimazaki | B60T 8/344 |
| 2022/0289161 A1* | 9/2022 | Leiber | B60T 13/686 |

OTHER PUBLICATIONS

Written Opinion (PCT/ISA/237) dated Jun. 18, 2019, by the Japanese Patent Office as the International Searching Authority for International Application No. PCT/JP2019/013785.

* cited by examiner

BRAKING CONTROL DEVICE

TECHNICAL FIELD

The present disclosure relates to a braking control device.

BACKGROUND ART

A braking control device is configured to mechanically generate a master pressure (an output pressure of a master cylinder), in response to a brake operation of a driver, even though an abnormality occurs in an electric system, such as a state where power cannot be supplied to each device. The braking control device having such configuration includes, for example, a fluid pressure chamber configured to supply a brake fluid, in response to a brake operation, a stroke simulator, a reservoir, a simulator cutoff valve provided on a flow path for interconnecting the fluid pressure chamber and the stroke simulator, and a reservoir cutoff valve provided between the stroke simulator and the reservoir. The simulator cutoff valve is a normally close electromagnetic valve that is closed in a non-energization state. The simulator cutoff valve is normally energized and is thus in an open state when an ignition becomes on. Herein, Japanese Unexamined Application Publication N. 2009-23553 discloses a control of increasing a supply current (control current) to the simulator cutoff valve each time a brake pedal is depressed and then reducing the supply current. Thereby, power can be saved during the brake control.

CITATION LIST

Patent Literature

PTL 1: Japanese Unexamined Application Publication N. 2009-23553

SUMMARY OF INVENTION

Technical Problem

However, the brake control device has room for improvement in terms of compatibility of power saving and suppression of deterioration in brake feeling. The present disclosure has been made in view of the situation, and an object thereof is to provide a braking control device capable of achieving both power saving and suppression of deterioration in brake feeling.

Solution to Problem

A braking control device of the present disclosure includes a reservoir connected to a fluid pressure chamber configured to supply a brake fluid in response to an operation of a brake operation member, a first flow path between the reservoir and the fluid pressure chamber, a second flow path connected to the first flow path at a connection part, a stroke simulator configured to apply a reactive force pressure to the brake operation member as a brake fluid is supplied thereto from the fluid pressure chamber via the first flow path and the second flow path, a reservoir cutoff valve provided in the first flow path between the reservoir and the connection part, the reservoir cutoff valve configured to be opened in a non-energization state, an operation determination circuit configured to determine whether the brake operation member is in an operation execution state in which the brake operation member being operated is, and a current control circuit configured to supply a first current to the reservoir cutoff valve when the operation determination circuit determines the brake operation member is in the operation execution state, and the current control circuit configured to supply a second current greater than the first current to the reservoir cutoff valve when the operation determination circuit determines the brake operation member is not in the operation execution state.

Advantageous Effects of Invention

According to the present disclosure, in a situation where the brake operation is not performed, the supply current to the reservoir cutoff valve is reduced, so that power can be saved. Also, the simulator cutoff valve can be controlled as usual and can be opened, irrespective of whether or not the brake operation. Therefore, the deterioration in brake feeling due to disconnection of the stroke simulator and the fluid pressure chamber is suppressed. That is, according to the present disclosure, it is possible to achieve both the power saving and the suppression of deterioration in brake feeling.

DESCRIPTION OF EMBODIMENTS

Figure 1:
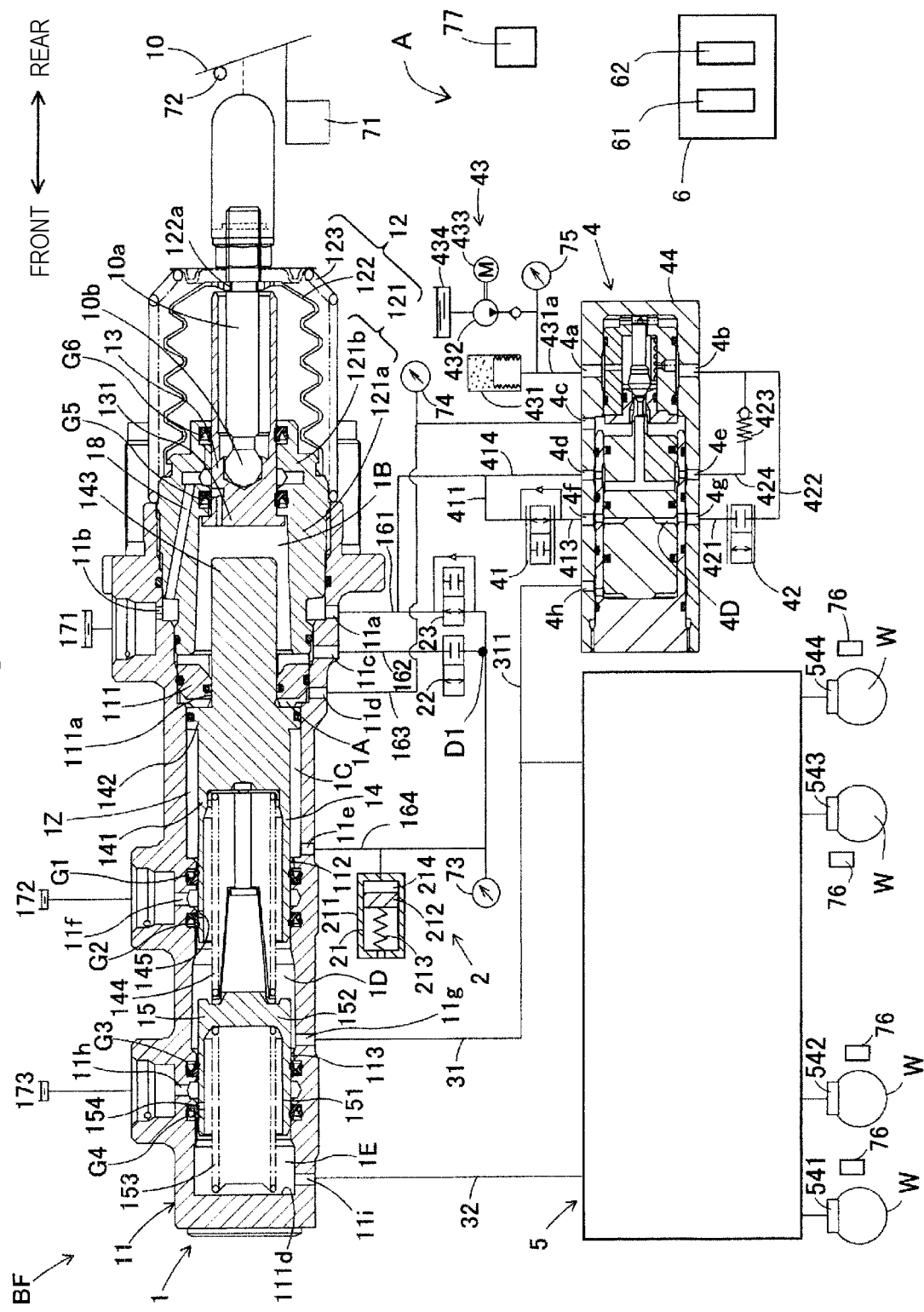
FIG. 1 is a configuration view of a vehicle braking device including a braking control device of the present embodiment.

Hereinbelow, an embodiment of the present disclosure will be described with reference to the drawings. The drawings used for descriptions are conceptual views, and shapes of respective parts may not be strictly exact. As shown in FIG. 1, a vehicle braking device BF includes a master cylinder 1, a reactive force generation device 2, a simulator cutoff valve 22, a reservoir cutoff valve 23, a servo pressure generation device 4, an actuator 5, wheel cylinders 541 to 544, a variety of sensors 71 to 77, and a brake ECU 6. The vehicle braking device BF includes a braking control device A.

The master cylinder 1 is a part configured to supply a brake fluid to the actuator 5, in response to an operation amount on a brake pedal (corresponding to "brake operation member") 10, and has a cylinder body 11, a cover cylinder 12, an input piston 13, a first master piston 14, and a second master piston 15. The brake pedal 10 may be a brake operation means with which a driver can perform a brake operation.

The cylinder body 11 is a substantially cylindrical bottomed housing of which front is closed and rear is opened. An inner wall part 111 protruding in an inwardly directed flange shape is provided in the vicinity of the rear on an inner periphery side of the cylinder body 11. A center of the inner wall part 111 is formed as a through-hole 111a penetrating in a front and rear direction. Also, small-diameter parts 112 and 113 of which inner diameters are slightly small are provided in front of the inner wall part 111 in the cylinder body 11. That is, the small-diameter parts 112 and 113 protrude in an annular shape from an inner peripheral surface of the cylinder body 11. In the cylinder body 11, a first master piston 14 is disposed so as to be axially movable in sliding contact with the small-diameter part 112. Likewise, a second master piston 15 is disposed so as to be axially movable in sliding contact with the small-diameter part 113.

The cover cylinder 12 is configured by a substantially cylindrical cylinder part 121, a bellows tube-shaped boot 122, and a cup-shaped compression spring 123. The cylinder part 121 is disposed on a rear end-side of the cylinder body 11, and is coaxially fitted in an opening on a rear side of the cylinder body 11. An inner diameter of a front portion 121a of the cylinder part 121 is larger than an inner diameter of the through-hole 111a of the inner wall part 111. Also, an inner diameter of a rear portion 121b of the cylinder part 121 is smaller than the inner diameter of the front portion 121a.

The dust-proof boot 122 can be expanded and contracted in a bellows tube shape in the front and rear direction, and is attached on its front side so as to contact an opening on a rear end side of the cylinder part 121. A through-hole 122a is formed at a rear center of the boot 122. The compression spring 123 is a coil-shaped urging member disposed around the boot 122, and a front side thereof is in contact with a rear end of the cylinder body 11 and a rear side is radially reduced so as to come close to the through-hole 122a of the boot 122. A rear end of the boot 122 and a rear end of the compression spring 123 are coupled to an operation rod 10a. The compression spring 123 urges rearward the operation rod 10a.

The input piston 13 is a piston configured to slide in the cover cylinder 12 in response to an operation of the brake pedal 10. The input piston 13 is a substantially cylindrical bottomed piston having a bottom surface at the front and an opening at the rear. A bottom wall 131 configuring the bottom surface of the input piston 13 has a larger diameter than other part of the input piston 13. The input piston 13 is liquid-tightly disposed so as to be axially slidable in the rear portion 121b of the cylinder part 121, and the bottom wall 131 is disposed on an inner periphery side of the front portion 121a of the cylinder part 121.

In the input piston 13, the operation rod 10a configured to operate in conjunction with the brake pedal 10 is disposed. A pivot 10b at a tip end of the operation rod 10a is adapted to push and move forward the input piston 13. A rear end of the operation rod 10a protrudes outward through the opening on the rear side of the input piston 13 and the through-hole 122a of the boot 122, and is connected to the brake pedal 10. When the brake pedal 10 is depressed, the operation rod 10a is advanced while pushing and moving axially the boot 122 and the compression spring 123. The input piston 13 is also advanced in conjunction with the advance of the operation rod 10a.

The first master piston 14 is disposed to be axially slidable on the inner wall part 111 of the cylinder body 11. The first master piston 14 has a pressurizing cylindrical part 141, a flange part 142, and a protrusion 143, which are integrally formed sequentially from the front side. The pressurizing cylindrical part 141 is formed into a substantially cylindrical bottomed shape having an opening at the front, has a gap with the inner peripheral surface of the cylinder body 11, and is in sliding contact with the small-diameter part 112. In an internal space of the pressurizing cylindrical part 141, a coil-shaped urging member 144 is disposed between the pressurizing cylindrical part and the second master piston 15. The urging member 144 urges rearward the first master piston 14. In other words, the first master piston 14 is urged toward a set initial position by the urging member 144.

The flange part 142 has a larger diameter than the pressurizing cylindrical part 141, and is in sliding contact with the inner peripheral surface of the cylinder body 11. The protrusion 143 has a smaller diameter than the flange part 142, and is liquid-tightly disposed so as to be slidable in the through-hole 111a of the inner wall part 111. A rear end of the protrusion 143 protrudes into an internal space of the cylinder part 121 beyond the through-hole 111a, and is spaced from an inner peripheral surface of the cylinder part 121. A rear end face of the protrusion 143 is spaced from the bottom wall 131 of the input piston 13, and a spacing distance thereof can be varied.

Herein, a "first master chamber 1D" is defined by the inner peripheral surface of the cylinder body 11, the pressurizing cylindrical part 141 of the first master piston 14, and the second master piston 15. Also, a rear chamber "1Z" is defined at the rear of the first master chamber 1D by the inner peripheral surface of the cylinder body 11, the small-diameter part 112, the inner wall part 111, and the first master piston 14. The flange part 142 of the first master piston 14 divides the rear chamber 1Z into front and rear, so that a "second fluid pressure chamber 1C" is formed on the front side of the flange part 142 and a "servo chamber 1A" is formed on the rear side of the flange part 142. A volume of the second fluid pressure chamber 1C decreases as the first master piston 14 is advanced, and increases as the first master piston 14 is retreated. Also, a "first fluid pressure chamber (corresponding to a "fluid pressure chamber") 1B" is defined by the inner peripheral surface of the cylinder body 11, the inner wall part 111, the front portion 121a of the cylinder part 121, the protrusion 143 of the first master piston 14, and the input piston 13.

The second master piston 15 is disposed so as to be axially movable in sliding contact with the small-diameter part 113 on a front side of the first master piston 14 in the cylinder body 11. The second master piston 15 is formed integrally with a tubular pressurizing cylindrical part 151 having an opening at the front, and a bottom wall 152 formed to close a rear side of the pressurizing cylindrical part 151. The bottom wall 152 supports the urging member 144 between the bottom wall and the first master piston 14. In an internal space of the pressurizing cylindrical part 151, a coil-shaped urging member 153 is disposed between the pressurizing cylindrical part and a closed inner bottom surface 111d of the cylinder body 11. The urging member 153 urges rearward the second master piston 15. In other words, the second master piston 15 is urged toward a set initial position by the urging member 153. A "second master chamber 1E" is defined by the inner peripheral surface and the inner bottom surface 111d of the cylinder body 11 and the second master piston 15.

The master cylinder 1 is formed with ports 11a to 11i for communicating an inside and an outside of the master cylinder each other. The port 11a is formed at the rear of the inner wall part 111 of the cylinder body 11. The port 11b is formed to face the port 11a, in an axially similar position to the port 11a. The port 11a and the port 11b communicate with each other via an annular space between the inner peripheral surface of the cylinder body 11 and an outer peripheral surface of the cylinder part 121. The port 11a and the port 11b connect to a pipe 161 and also to a reservoir 171 (low-pressure source).

Also, the port 11b communicates with the first fluid pressure chamber 1B by a passage 18 formed in the cylinder part 121 and the input piston 13. The passage 18 is formed so that it is blocked when the input piston 13 is advanced. Thereby, the first fluid pressure chamber 1B and the reservoir 171 are cut off each other. The port 11c is formed at the rear of the inner wall part 111 and in front of the port 11a, and communicates the first fluid pressure chamber 1B and a pipe 162 each other. The port 11d is formed in front of the port 11c, and communicates the servo chamber 1A and a pipe 163 each other. The port 11e is formed in front of the port 11d, and communicates the second fluid pressure chamber 1C and a pipe 164 each other.

The port 11f is formed between both seal members G1 and G2 of the small-diameter part 112, and communicates a reservoir 172 and the inside of the cylinder body 11 each other. The port 11f communicates with the first master chamber 1D via a passage 145 formed in the first master piston 14. The passage 145 is formed in a position in which the port 11f and the first master chamber 1D are cut off when the first master piston 14 is advanced. The port 11g is formed in front of the port 11f, and communicates the first master chamber 1D and a pipe conduit 31 each other.

The port 11h is formed between both seal members G3 and G4 of the small-diameter part 113, and communicates a reservoir 173 and the inside of the cylinder body 11 each other. The port 11h communicates with the second master chamber 1E via a passage 154 formed in the pressurizing cylindrical part 151 of the second master piston 15. The passage 154 is formed in a position in which the port 11h and the second master chamber 1E are cut off when the second master piston 15 is advanced. The port 11i is formed in front of the port 11h, and communicates the second master chamber 1E and a pipe conduit 32 each other.

Also, a seal member such as an O-ring is appropriately disposed in the master cylinder 1. The seal members G1 and G2 are disposed at the small-diameter part 112, and are in liquid-tight contact with an outer peripheral surface of the first master piston 14. Likewise, the seal members G3 and G4 are disposed at the small-diameter part 113, and are in liquid-tight contact with an outer peripheral surface of the second master piston 15. Also, seal members G5 and G6 are disposed between the input piston 13 and the cylinder part 121.

The stroke sensor 71 is a sensor configured to detect an operation amount (stroke) of the brake pedal 10 made by a driver, and is configured to transmit a detection signal to the brake ECU 6. The brake stop switch 72 is a switch configured to detect whether or not a driver's operation of the brake pedal 10 by a binary signal, and is configured to transmit a detection signal to the brake ECU 6.

The reactive force generation device 2 is a device configured to generate a reactive force that opposes an operation force when the brake pedal 10 is operated, and mainly includes a stroke simulator 21. The stroke simulator 21 is configured to generate a reactive force pressure in the first fluid pressure chamber 1B and the second fluid pressure chamber 1C, in response to an operation of the brake pedal 10. The stroke simulator 21 has a configuration where a piston 212 is slidably fitted in a cylinder 211. The piston 212 is urged rearward by a compression spring 213, and a reactive force pressure chamber 214 is formed on a rear surface-side of the piston 212. The reactive force pressure chamber 214 is connected to the second fluid pressure chamber 1C via the pipe 164 and the port 11e, and the reactive force pressure chamber 214 is connected to the simulator cutoff valve 22 and the reservoir cutoff valve 23 via the pipe 164. The pipes 161, 162 and 164 are connected by a connection part D1.

The simulator cutoff valve 22 is a normally closed electromagnetic valve that is closed in a non-energization state, and opening/closing (a flow rate) thereof is controlled by the brake ECU 6. The simulator cutoff valve 22 is opened to a degree of opening corresponding to an input current value. The simulator cutoff valve 22 is provided on the pipe 162. The pipe 162 communicates with the first fluid pressure chamber 1B via the port 11c. When the simulator cutoff valve 22 is opened, the first fluid pressure chamber 1B and the stroke simulator 21 communicate with each other via the pipes 162 and 164, and when the simulator cutoff valve 22 is closed, the first fluid pressure chamber 1B is closed.

When the simulator cutoff valve 22 is closed, the first fluid pressure chamber 1B and the second fluid pressure chamber 1C are cut off each other. In the cutoff state, the first fluid pressure chamber 1B is closed, so that there is no place for the brake fluid to flow, and the input piston 13 and the first master piston 14 operate in conjunction with each other while keeping a constant spacing distance. Also, when the simulator cutoff valve 22 is opened, the first fluid pressure chamber 1B and the second fluid pressure chamber 1C communicate with each other. The pressure sensor 73 is a sensor configured to detect a fluid pressure (reactive force pressure) in the second fluid pressure chamber 1C, and is connected to the pipe 164. The pressure sensor 73 is configured to transmit a detection signal to the brake ECU 6.

The reservoir cutoff valve 23 is a normally open electromagnetic valve that is opened in a non-energization state, and opening/closing (a flow rate) thereof is controlled by the brake ECU 6. The reservoir cutoff valve 23 is opened to a degree of opening corresponding to an input current value. The reservoir cutoff valve 23 is provided on the pipe 161. The pipe 164 communicates with the second fluid pressure chamber 1C via the port 11e, and the pipe 161 communicates with the reservoir 171 via the port 11a. The reservoir cutoff valve 23 is configured to communicate the stroke simulator 21 and the reservoir 171 with each other in an open state so as not to generate a reactive force pressure, and to cut off the same in a closed state so that a reactive force pressure can be generated.

The pipes 161 and 162 configure a first flow path for interconnecting the first fluid pressure chamber 1B and the reservoir 171. The pipe 164 configures a second flow path connected to the first flow path at the connection part D1, and interconnects the stroke simulator 21 and the first flow path. The reservoir cutoff valve 23 is provided in the first flow path between the reservoir 171 and the connection part D1. The simulator cutoff valve 22 is provided in the first flow path between the first fluid pressure chamber 1B and the connection part D1.

In normal control, the simulator cutoff valve 22 and the reservoir cutoff valve 23 are energized when an ignition becomes on (a vehicle starts). In the conventional control, when the ignition becomes on, for example, the simulator cutoff valve 22 is completely opened, and the reservoir cutoff valve 23 is closed so that the brake fluid does not leak to the reservoir 171. When the power is not supplied to the simulator cutoff valve 22 and the reservoir cutoff valve 23 due to an abnormality in an electric system, the first fluid pressure chamber 1B is put in a tightly closed state and the first master piston 14 is mechanically advanced in conjunction with the advance of the input piston 13 by the driver's brake operation, so that the master pressure is generated.

The servo pressure generation device 4 is a so-called hydraulic booster (boosting device), and includes a pressure reducing valve 41, a pressure increasing valve 42, a pressure supply unit 43, and a regulator 44. The pressure reducing valve 41 is a normally open electromagnetic valve (normally open valve) that is opened in the non-energization state, and a flow rate (or pressure) thereof is controlled by the brake ECU 6. One side of the pressure reducing valve 41 is connected to the pipe 161 via a pipe 411, and the other side of the pressure reducing valve 41 is connected to a pipe 413. That is, one side of the pressure reducing valve 41 communicates with the reservoir 171 via the pipes 411 and 161 and the ports 11a and 11b. When the pressure reducing valve 41 is closed, the outflow of the brake fluid from a pilot chamber 4D is prevented. In the meantime, the reservoir 171 and a reservoir 434 communicate with each other, although not shown. The reservoir 171 and the reservoir 434 may be the same reservoir.

The pressure increasing valve 42 is a normally closed electromagnetic valve (normally closed valve) that is closed in the non-energization state, and a flow rate (or pressure) thereof is controlled by the brake ECU 6. One side of the pressure increasing valve 42 is connected to a pipe 421, and the other side of the pressure increasing valve 42 is connected to a pipe 422. The pressure supply unit 43 is a unit configured to mainly supply a high-pressure brake fluid to the regulator 44. The pressure supply unit 43 includes an accumulator 431, a fluid pressure pump 432, a motor 433, and the reservoir 434. The pressure sensor 75 is configured to detect a fluid pressure of the accumulator 431. Since the configuration of the pressure supply unit 43 is well known, the descriptions thereof are omitted.

The regulator 44 is a mechanical regulator, and a pilot chamber 4D is formed therein. Also, the regulator 44 is formed with a plurality of ports 4a to 4h. The pilot chamber 4D is connected to the pressure reducing valve 41 via the port 4f and the pipe 413, and is connected to the pressure increasing valve 42 via the port 4g and the pipe 421. When the pressure increasing valve 42 is opened, a high-pressure brake fluid is supplied from the accumulator 431 to the pilot chamber 4D via the ports 4a, 4b and 4g, so that the piston is moved and the pilot chamber 4D is enlarged. In association with the enlargement, the valve member moves, and the port 4a and the port 4c communicate with each other, so that the high-pressure brake fluid is supplied to the servo chamber 1A via the pipe 163. In the meantime, when the pressure reducing valve 41 is opened, the fluid pressure (pilot pressure) in the pilot chamber 4D is lowered, and the flow path between the port 4a and the port 4c is cut off by the valve member. In this way, the brake ECU 6 controls the pressure reducing valve 41 and the pressure increasing valve 42, thereby controlling the pilot pressure corresponding to the servo pressure and the servo pressure. An actual servo pressure is detected by the pressure sensor 74. The present embodiment has a by-wire configuration where a brake operation mechanism and a pressure adjusting mechanism are separated from each other.

The actuator 5 is a device configured to adjust a master pressure (a fluid pressure in the first master chamber 1D and the second master chamber 1E) and to supply the same to the wheel cylinders 541 to 544. The actuator 5 is disposed between the first master chamber 1D and second master chamber 1E and the wheel cylinders 541 to 544. The actuator 5 and the first master chamber 1D are interconnected by the pipe conduit 31, and the actuator 5 and the second master chamber 1E are interconnected by the pipe conduit 32. The actuator 5 is configured by a plurality of electromagnetic valves, a pump and the like, and is configured to adjust fluid pressures (wheel pressures) in the wheel cylinders 541 to 544, in response to an instruction from the brake ECU 6. The actuator 5 is configured to execute anti-skid control (ABS control) and the like, for example, based on a command from the brake ECU 6. Each wheel W is provided with the wheel speed sensor 76.

As such, the braking control device A of the present embodiment includes the reservoir 171 connected to the first fluid pressure chamber 1B configured to output the brake fluid in response to an operation of the brake pedal 10, via the pipes 161 and 162 (first flow path), the stroke simulator 21 configured to supply the reactive force pressure to the brake pedal 10 as the brake fluid is supplied from the first fluid pressure chamber 1B, via the pipes 161 and 162 and the pipe 164 (second flow path) connected to the pipes 161 and 162, the reservoir cutoff valve 23 provided in the pipes 161 and 162 between reservoir 171 and the connection part D1 between the pipes 161 and 162 and the pipe 164 and configured to be opened in a non-energization state, the simulator cutoff valve 22 provided in the pipes 161 and 162 between the first fluid pressure chamber 1B and the connection part D1, configured to be closed in a non-energization state and having a degree of opening that increases as supplied current increases, and the brake ECU 6 configured to control the reservoir cutoff valve 23 and the simulator cutoff valve 22.

(First Pattern of Power Saving Control)

Herein, power saving control of the present embodiment is described. The brake ECU 6 has an operation determination circuit 61 and a current control circuit 62, as functions. The operation determination circuit 61 is configured to determine whether a current situation is an operation execution situation, regarding a situation in which the brake pedal 10 is being operated as the "operation execution situation". The operation determination circuit 61 determines whether the brake pedal 10 is actually depressed, based on a detection result of the stroke simulator 21 and/or the brake stop switch 72.

Also, the operation determination circuit 61 is configured to determine whether the brake pedal 10 is going to be operated. The operation determination circuit 61 is configured to determine whether the brake operation is likely to be executed, based on a detection result of the sensor 77 configured to measure a distance between vehicles or a distance between a vehicle and an object ahead of the vehicle and/or the wheel speed sensor 76, for example. For example, when a distance between a vehicle and another vehicle or an object is small and a vehicle speed is high, the brake operation is going to be executed With high probability. Therefore, the operation determination circuit 61 can determine a state about the brake operation, based on detection results of the sensors 76 and 77 or the like.

When the probability that the brake pedal 10 will be operated is high, the operation determination circuit 61 determines the state, as the "operation execution state". That is, the operation execution state of the present embodiment includes a state in which the brake pedal 10 is being operated and a state in which the brake pedal 10 is going be operated with high probability. When the brake pedal 10 is being operated or when the brake pedal 10 is going be operated, the operation determination circuit 61 determines the brake pedal 10 is in the operation execution situation. In the meantime, the sensor 77 is, for example, a millimeter wave radar or the like.

Figure 2:
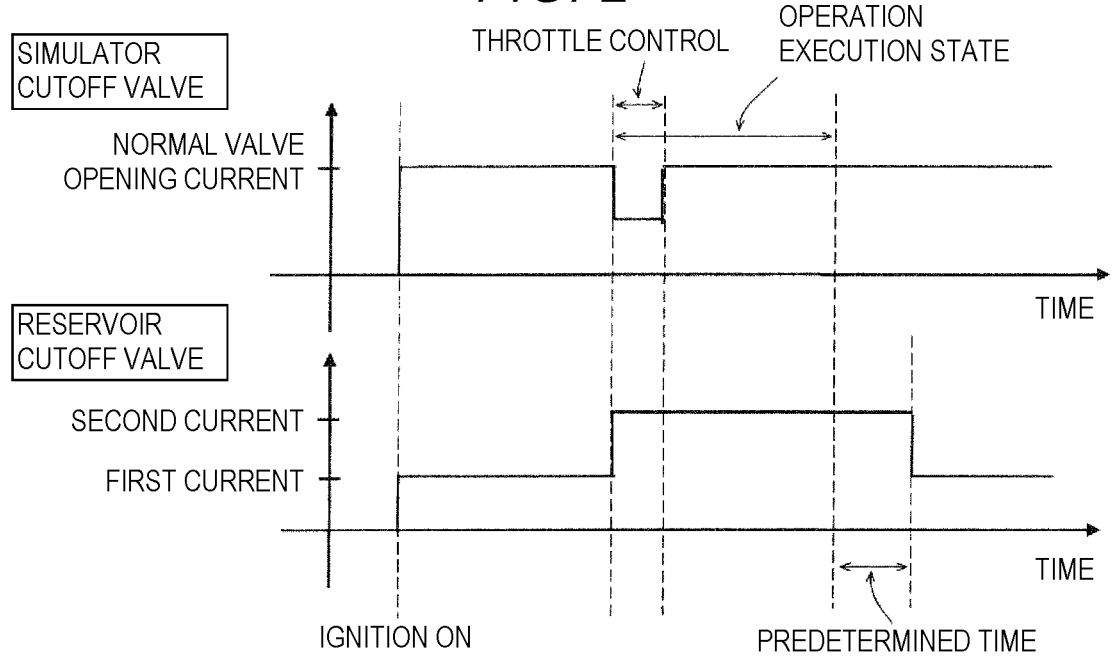
FIG. 2 is a timing chart showing an example of power saving control of the present embodiment.

When the operation determination circuit 61 determines that the brake pedal 10 is not in the operation execution situation, the current control circuit 62 supplies a first current to the reservoir cutoff valve 23, and when the operation determination circuit 61 determines that the brake pedal 10 is in the operation execution state, the current control circuit 62 supplies a second current greater than the first current to the reservoir cutoff valve 23 (refer to the lower part of FIG. 2). The first current is set to a value equal to or greater than 0 and smaller than the second current (0≤the first current<the second current). That is, in a state other than the operation execution state, the current control circuit 62 supplies a relatively small current to the reservoir cutoff valve 23 to close slightly the same, and in the operation execution state, the current control circuit 62 supplies a relatively large current to the reservoir cutoff valve 23 to close the same as usual. The second current is set to a current (normal valve closing current) at which the reservoir cutoff valve 23 is closed so that the brake fluid is not leaked to the reservoir 171, for example. In the meantime, when the ignition becomes on, the current control circuit 62 supplies a normal valve opening current (for example, a current necessary for complete opening) to the simulator cutoff valve 22 to open the same as usual.

According to the present embodiment, in a state in which the brake operation is not performed or the brake operation is difficult to be performed, the supply current through the reservoir cutoff valve 23 is reduced, so that power can be saved. Also, since the simulator cutoff valve 22 can be controlled as usual and can be opened, irrespective of whether the brake operation is performed, deterioration in brake feeling due to disconnection between the stroke simulator 21 and the first fluid pressure chamber 1B is suppressed. For example, in a control of applying the normal valve opening current through the simulator cutoff valve 22 whenever the brake pedal 10 is operated, a step is likely to occur (a step-like shape is likely to occur) in an increase gradient of the stroke of the brake pedal 10, so that an influence on the brake feeling relatively increases. However, in the present embodiment, the target of the power saving control is the reservoir cutoff valve 23 in which a step is difficult to occur in the increase gradient of the stroke, and the influence on the brake feeling is prevented. That is, according to the present embodiment, it is possible to achieve both power saving and suppression of deterioration in brake feeling.

Also, in the present embodiment, the operation execution state includes the state in which the brake operation is going to be performed with high probability. Therefore, the reservoir cutoff valve 23 can be controlled earlier than actual execution of the brake operation, and the influence on the brake feeling can be prevented as much as possible.

Also, the current control circuit 62 is configured to continue to supply the second current to the reservoir cutoff valve 23, irrespective of the determination result of the operation determination circuit 61, for a predetermined time since the operation of the brake pedal 10 is released (after the brake operation is over). Thereby, for example, even when a pumping operation of repeating the brake operation in a short time is performed, an increase in the number of times of changing the degree of opening of the reservoir cutoff valve 23 is suppressed, which is advantageous in terms of suppression of operating noises and improvement of durability.

(Second Pattern of Power Saving Control)

A pattern in which a "throttle control" is added to the first pattern is described as a second pattern of the power saving control. The current control circuit 62 is configured to execute a throttle control of reducing the supply current through the simulator cutoff valve 22 (i.e., reducing the degree of opening of the simulator cutoff valve 22), in conformity to a timing of switching the supply current through the reservoir cutoff valve 23 from the first current through the second current. In the second pattern, the throttle control can be said as a control of reducing the degree of opening of the simulator cutoff valve 22 after the operation determination circuit 61 determines that the brake pedal 10 is in the operation execution state until the reservoir cutoff valve 23 is closed by flowing the second current.

As shown in FIG. 2, the current control circuit 62 reduces the supply current through the simulator cutoff valve 22 to narrow a flow path of the simulator cutoff valve 22 at a timing of supplying the second current to the reservoir cutoff valve 23. For example, the current control circuit 62 reduces the supply current through the simulator cutoff valve 22 until a predetermined time elapses since the second current is applied to the reservoir cutoff valve 23. The predetermined time can be set as a time necessary to complete the valve closing operation, for example.

According to the throttle control, when the brake pedal 10 is operated in a state where the reservoir cutoff valve 23 is slightly opened (or completely opened) by the first current, it is possible to suppress the brake fluid flowing out from the first fluid pressure chamber 1B from flowing into the reservoir 171 via the reservoir cutoff valve 23 while keeping the communication between the first fluid pressure chamber 1B and the stroke simulator 21. That is, the influence of the power saving control on the brake feeling is further suppressed. In the meantime, the first pattern of the power saving control is equivalent to a pattern where the throttle control is omitted in FIG. 2.

(Third Pattern of Power Saving Control)

Figure 3:
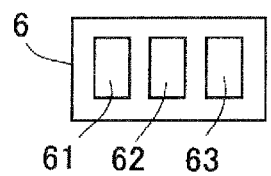
FIG. 3 is a configuration view of a brake ECU in a modified aspect of the present embodiment.

As shown in FIG. 3, in a third pattern of the power saving control, the brake ECU 6 further includes a speed prediction circuit 63. The speed prediction circuit 63 predicts an operation speed of the brake pedal 10 when it is determined by the operation determination circuit 61 that the probability that the brake pedal 10 will be operated is high. Specifically, the speed prediction circuit 63 is configured to determine whether an operation speed is high, i.e., whether a rapid brake operation (emergency brake operation) is executed, based on the detection result of the sensor 77 and/or the wheel speed sensor 76. The speed prediction circuit 63 determines that the operation speed is high, when a distance between vehicles is equal to or smaller than a predetermined value and a vehicle speed is equal to or higher than a predetermined speed, for example.

In the throttle control, the current control circuit 62 is configured to reduce the degree of opening of the simulator cutoff valve 22 as the operation speed predicted by the speed prediction circuit 63 is higher. Specifically, when it is determined by the speed prediction circuit 63 that the operation speed is high, the current control circuit 62 sets a first throttle current, as the supply current through the simulator cutoff valve 22 in the throttle control, and when it is not determined by the speed prediction circuit 63 that the operation speed is high, the current control circuit 62 sets a second throttle current greater than the first throttle current, as the supply current through the simulator cutoff valve 22 in the throttle control (first throttle current<second throttle current<normal valve opening current). Thereby, when a rapid brake operation is predicted, the degree of opening of the simulator cutoff valve 22 is further reduced, and the inflow of the brake fluid into the reservoir 171 until the reservoir cutoff valve 23 is closed may be more effectively prevented.

(Fourth Pattern of Power Saving Control)

Figure 4:
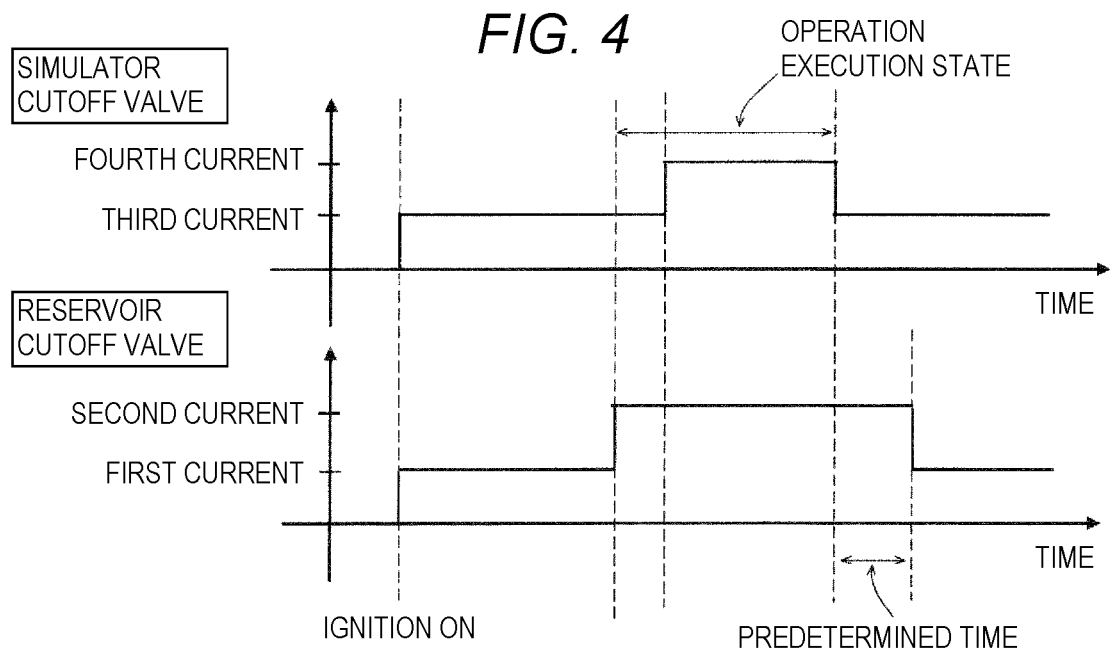
FIG. 4 is a timing chart showing an example of power saving control of the present embodiment.

In a fourth pattern of the power saving control, in addition to the first pattern, when the operation determination circuit 61 determines that the brake pedal 10 is not in the operation execution state, the current control circuit 62 supplies a third current to the simulator cutoff valve 22, and when the operation determination circuit 61 determines that the brake pedal is in the operation execution situation, the current control circuit 62 supplies a fourth current greater than the third current to the simulator cutoff valve 22 (shown in FIG. 4). The third current is a current that causes the simulator cutoff valve 22 to slightly open by flowing through the simulator cutoff valve 22.

That is, similarly to the reservoir cutoff valve 23, the current control circuit 62 reduces the supply current through the simulator cutoff valve 22 in a state other than the operation execution state. Thereby, in the state other than the operation execution state, the simulator cutoff valve 22 and the reservoir cutoff valve 23 are slightly opened by the relatively small current. When the operation determination circuit 61 determines that the brake pedal 10 is in the operation execution situation, the supply current through the simulator cutoff valve 22 and the reservoir cutoff valve 23 is increased. The fourth current is equivalent to the normal valve opening current of the simulator cutoff valve 22.

According to the above configuration, while suppressing the influence on the brake feeling upon the brake operation by keeping the simulator cutoff valve 22 in an opened state, the power saving for the simulator cutoff valve 22 can be achieved.

Herein, when the operation determination circuit 61 that the brake pedal 10 is in the operation execution situation in a state where the third current is supplied to the simulator cutoff valve 22, the current control circuit 62 supplies the fourth current to the simulator cutoff valve 22 after supplying the second current to the reservoir cutoff valve 23. That is, as shown in FIG. 4, when the current state becomes the operation execution situation, the current control circuit 62 first applies the relatively large current (second current) to the reservoir cutoff valve 23, and then applies the relatively large current (fourth current) to the simulator cutoff valve 22. The simulator cutoff valve 22 is completely opened after the reservoir cutoff valve 23 is closed, so that it is possible to further securely suppress the brake fluid from rapidly flowing into the reservoir 171. That is, it is possible to further suppress the influence of the power saving control on the brake feeling.

(Fifth Pattern of Power Saving Control)

As a fifth pattern of the power saving control, the current control circuit 62 executes a control of setting a start timing of the throttle control in the second pattern to a timing before the timing at which the supply current through the reservoir cutoff valve 23 is switched from the first current through the second current. For example, when the operation determination circuit 61 determines that the brake pedal 10 is going to be operated with high probability, the current control circuit 62 executes the throttle control, and when the operation determination circuit 61 determines that the brake pedal 10 is being operated, the current control circuit 62 switches the supply current through the reservoir cutoff valve 23 from the first current through the second current. The throttle control has been performed until the reservoir cutoff valve 23 is closed by flowing the second current or until the operation determination circuit 61 determines that the brake pedal 10 is not going to be operated with no the brake pedal 10 operation, for example. Thereby, it is possible to narrow the flow path of the simulator cutoff valve 22 before the second current is supplied to the reservoir cutoff valve 23, so that it is possible to further securely suppress the influence of the power saving control on the brake feeling. Like this, the control on the supply current to the simulator cutoff valve 22 may be performed based on the probability of the brake operation, and the control on the supply current to the reservoir cutoff valve 23 may be performed based on the brake operation.

(Others)

The present disclosure is not limited to the above embodiment. For example, the operation execution state may be set to only the state in which the brake pedal 10 is being operated. Also in this case, it is possible to achieve both the power saving and the suppression of deterioration in brake feeling. Also, the control on the supply current to the simulator cutoff valve 22 and the control on the supply current through the reservoir cutoff valve may be respectively performed based on different types of determinations (for example, prediction or actual measurement). Also, for the determination as to whether or not the brake operation, a depression sensor may be used. Also, the supply current to the reservoir cutoff valve 23 may be switched from the second current through the first current at the time when the operation of the brake pedal 10 is released. Also, the speed prediction circuit 63 may predict the operation speed in more detail (for example, high, medium, low, etc.). Also, the elements for determining the probability that the brake operation will be executed are not limited to the above. For example, a detection result of a front camera may be used. Also, the present disclosure can also be applied to an automatic brake control.

The invention claimed is:

1. A braking control device comprising:
   a reservoir connected to a fluid pressure chamber configured to supply a brake fluid in response to an operation of a brake operation member;
   a first flow path between the reservoir and the fluid pressure chamber;
   a second flow path connected to the first flow path at a connection part;
   a stroke simulator configured to apply a reactive force pressure to the brake operation member as a brake fluid is supplied thereto from the fluid pressure chamber via the first flow path and the second flow path;
   a reservoir cutoff valve provided in the first flow path between the reservoir and the connection part, the reservoir cutoff valve configured to be opened in a non-energization state;
   an operation determination circuit configured to determine whether the brake operation member is in an operation execution state; and
   a current control circuit configured to supply no current or a first current to the reservoir cutoff valve when the operation determination circuit determines the brake operation member is not in the operation execution state, and to supply a second current to the reservoir cutoff valve when the operation determination circuit determines the brake operation member is in the operation execution state, wherein in the case that the current control circuit is configured to supply the first current to the reservoir cutoff valve when the operation determination circuit determines the brake operation member is not in the operation execution state, the second current is greater than the first current.

2. The braking control device according to claim 1, wherein the operation determination circuit is configured to determine whether the brake operation member is going to be operated, and
   wherein the operation execution state includes a state in which the brake operation member is going to be operated.

3. The braking control device according to claim 1, further comprising a simulator cutoff valve provided in the first flow path between the fluid pressure chamber and the connection part, configured to be closed in a non-energization state and having a degree of opening that increases as supplied current increases,
wherein the current control circuit is configured to execute a throttle control of reducing supply current to the simulator cutoff valve, in response to a timing of switching supply current to the reservoir cutoff valve from no current or the first current to the second current.

4. The braking control device according to claim 3, further comprising a speed prediction circuit that predicts an operation speed of the brake operation member when the operation determination circuit determines the brake operation member is in going to be operated,
wherein the current control circuit is configured to perform the throttle control that reduce supply current to the simulator cutoff valve as the operation speed predicted by the speed prediction circuit increases.

5. The braking control device according to claim 1, wherein the current control circuit is configured to continue to supply the second current to the reservoir cutoff valve during a predetermined period of time from release of the brake operation member, irrespective of a determination result of the operation determination circuit.

6. The braking control device according to claim 1, further comprising a simulator cutoff valve provided in the first flow path between the fluid pressure chamber and the connection part, configured to be closed in a non-energization state and having a degree of opening that increases as supplied current increases,
wherein when the operation determination circuit determines that the brake operation member is not in the operation execution state, the current control circuit supplies a third current to the simulator cutoff valve, and when the operation determination circuit determines that the brake operation member is in the operation execution state, the current control circuit supplies a fourth current greater than the third current to the simulator cutoff valve.

7. The braking control device according to claim 6, wherein when the operation determination circuit determines that the brake operation member is in the operation execution state while the third current is supplied to the simulator cutoff valve, the current control circuit supplies the fourth current to the simulator cutoff valve after supplying the second current to the reservoir cutoff valve.

8. The braking control device according to claim 2, further comprising a simulator cutoff valve provided in the first flow path between the fluid pressure chamber and the connection part, configured to be closed in a non-energization state and having a degree of opening that increases as supplied current increases,
wherein the current control circuit is configured to execute a throttle control of reducing supply current to the simulator cutoff valve, in response to a timing of switching supply current to the reservoir cutoff valve from no current or the first current to the second current.

9. The braking control device according to claim 8, further comprising a speed prediction circuit that predicts an operation speed of the brake operation member when the operation determination circuit determines the brake operation member is in going to be operated,
wherein the current control circuit is configured to perform the throttle control that reduce supply current to the simulator cutoff valve as the operation speed predicted by the speed prediction circuit increases.

10. The braking control device according to claim 2, wherein the current control circuit is configured to continue to supply the second current to the reservoir cutoff valve during a predetermined period of time from release of the brake operation member, irrespective of a determination result of the operation determination circuit.

11. The braking control device according to claim 2, further comprising a simulator cutoff valve provided in the first flow path between the fluid pressure chamber and the connection part, configured to be closed in a non-energization state and having a degree of opening that increases as supplied current increases,
wherein when the operation determination circuit determines that the brake operation member is not in the operation execution state, the current control circuit supplies a third current to the simulator cutoff valve, and when the operation determination circuit determines that the brake operation member is in the operation execution state, the current control circuit supplies a fourth current greater than the third current to the simulator cutoff valve.

12. The braking control device according to claim 11, wherein when the operation determination circuit determines that the brake operation member is in the operation execution state while the third current is supplied to the simulator cutoff valve, the current control circuit supplies the fourth current to the simulator cutoff valve after supplying the second current to the reservoir cutoff valve.

13. The braking control device according to claim 3, wherein the current control circuit is configured to continue to supply the second current to the reservoir cutoff valve during a predetermined period of time from release of the brake operation member, irrespective of a determination result of the operation determination circuit.

14. The braking control device according to claim 3, further comprising a simulator cutoff valve provided in the first flow path between the fluid pressure chamber and the connection part, configured to be closed in a non-energization state and having a degree of opening that increases as supplied current increases,
wherein when the operation determination circuit determines that the brake operation member is not in the operation execution state, the current control circuit supplies a third current to the simulator cutoff valve, and when the operation determination circuit determines that the brake operation member is in the operation execution state, the current control circuit supplies a fourth current greater than the third current to the simulator cutoff valve.

15. The braking control device according to claim 14, wherein when the operation determination circuit determines that the brake operation member is in the operation execution state while the third current is supplied to the simulator cutoff valve, the current control circuit supplies the fourth current to the simulator cutoff valve after supplying the second current to the reservoir cutoff valve.

16. The braking control device according to claim 4, wherein the current control circuit is configured to continue to supply the second current to the reservoir cutoff valve during a predetermined period of time from release of the brake operation member, irrespective of a determination result of the operation determination circuit.

17. The braking control device according to claim 4, further comprising a simulator cutoff valve provided in the first flow path between the fluid pressure chamber and the connection part, configured to be closed in a non-energization state and having a degree of opening that increases as supplied current increases,
   wherein when the operation determination circuit determines that the brake operation member is not in the operation execution state, the current control circuit supplies a third current to the simulator cutoff valve, and when the operation determination circuit determines that the brake operation member is in the operation execution state, the current control circuit supplies a fourth current greater than the third current to the simulator cutoff valve.

18. The braking control device according to claim 17, wherein when the operation determination circuit determines that the brake operation member is in the operation execution state while the third current is supplied to the simulator cutoff valve, the current control circuit supplies the fourth current to the simulator cutoff valve after supplying the second current to the reservoir cutoff valve.

* * * * *